US011212294B2

(12) United States Patent
Katsak et al.

(10) Patent No.: US 11,212,294 B2
(45) Date of Patent: Dec. 28, 2021

(54) DATA PACKET SECURITY WITH EXPIRING TIME-BASED HASH MESSAGE AUTHENTICATION CODES (HMACS)

(71) Applicant: Grid7 LLC, Boulder, CO (US)

(72) Inventors: William Katsak, Doylestown, PA (US); James Barry, Castle Rock, CO (US)

(73) Assignee: Grid7 LLC, Boulder, CO (US)

( * ) Notice: Subject to any disclaimer, the term of this patent is extended or adjusted under 35 U.S.C. 154(b) by 374 days.

(21) Appl. No.: 16/247,480

(22) Filed: Jan. 14, 2019

(65) Prior Publication Data

US 2020/0084222 A1    Mar. 12, 2020

Related U.S. Application Data

(60) Provisional application No. 62/730,482, filed on Sep. 12, 2018.

(51) Int. Cl.
*H04L 29/06* (2006.01)

(52) U.S. Cl.
CPC ............ *H04L 63/12* (2013.01); *H04L 63/029* (2013.01)

(58) Field of Classification Search
CPC .................. H04L 63/12; H04L 2209/38; H04L 2463/121; H04L 63/0245; H04L 63/108; H04L 9/0869; H04L 9/0877; H04L 9/3242; H04L 9/3297; H04L 9/3247
See application file for complete search history.

(56) References Cited

U.S. PATENT DOCUMENTS

| | | | | |
|---|---|---|---|---|
| 8,392,709 | B1* | 3/2013 | Agrawal ............... | H04L 9/3228 713/169 |
| 2009/0327733 | A1* | 12/2009 | McDougal ............ | H04L 9/3236 713/176 |
| 2014/0289532 | A1* | 9/2014 | Kako .................... | H04L 9/3247 713/176 |
| 2018/0367306 | A1* | 12/2018 | Bahety ................ | H04L 63/0807 |

OTHER PUBLICATIONS

Internet Engineering Task Force (IETF) Request for Comments: 6238, TOTP: Time-Based One-Time Password Algorithm, D. M'Raihi, et al. (May 2011).
What is Proof of Elapsed Time Consensus? (PoET) Complete Beginner's Guide, B. Curran (Sep. 11, 2018) on Blockonomi.com.
Nakamoto, Satoshi, "Bitcoin: A Peer-to-Peer Electronic Cash System," 2009.

* cited by examiner

*Primary Examiner* — Olugbenga O Idowu
(74) *Attorney, Agent, or Firm* — Sanderson IP Law, Ltd.

(57) ABSTRACT

A system of secure data packets for transmission over a packet switched network includes an expiring Hash-based Message Authentication Code (HMAC) appended to the data packet. The expiring HMAC is calculated based on a shared secret and a clock time. A receiving network application or firewall with the shared secret validates the secure data packets based on a comparison of the expiring HMAC to the receiving network or application's own calculation of a valid HMAC based on the shared secret and the clock time. Applications executing on the receiving and sending networks do not need modification to use the secure data packet protocol because HMAC appending, validation, and removal may all occur at network boundaries on firewalls. Protected host endpoints may serve client endpoints using expiring HMAC data packets and other validation information based on security data stored on a shared ledger such as nonce values encountered by the network.

20 Claims, 7 Drawing Sheets

DATA PACKET SECURITY WITH EXPIRING TIME-BASED HASH MESSAGE AUTHENTICATION CODES (HMACS)

BACKGROUND OF THE INVENTION

In packet-switched computer networks, data transmissions across the network are packetized and the various packets may travel independent network paths from a data sender to a data receiver. Private networks may operate firewalls at a network boundary with a public packet switched network according to rules that determine which packets are allowed to pass across the boundary onto the private network and which packets are blocked from crossing the boundary between the private network and a public network.

Due to variable routing rules of the public packet switched network, there is no good way to establish the identity of the source of a packet that arrives at a private network firewall. Internet Protocol (IP) addresses and other meta information can be easily spoofed to make the packet appear as if it originated from a different address than the true address, such as to appear as if a packet originating with an attacker originated from a trusted source.

As data packets travel through various network hops en route to a destination, there are security risks such as "man-in-the-middle" attacks, where an attacker on the network located in between a data sender and a data receiver modifies packets to trick the receiver into treating the modified packets as having originated from the data sender.

Accordingly, there is a need for a secure data packet transmission protocol wherein a receiver of data packets can have an increased confidence that the data packets originated with a legitimate data sender and not an attacker.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Figure 1:
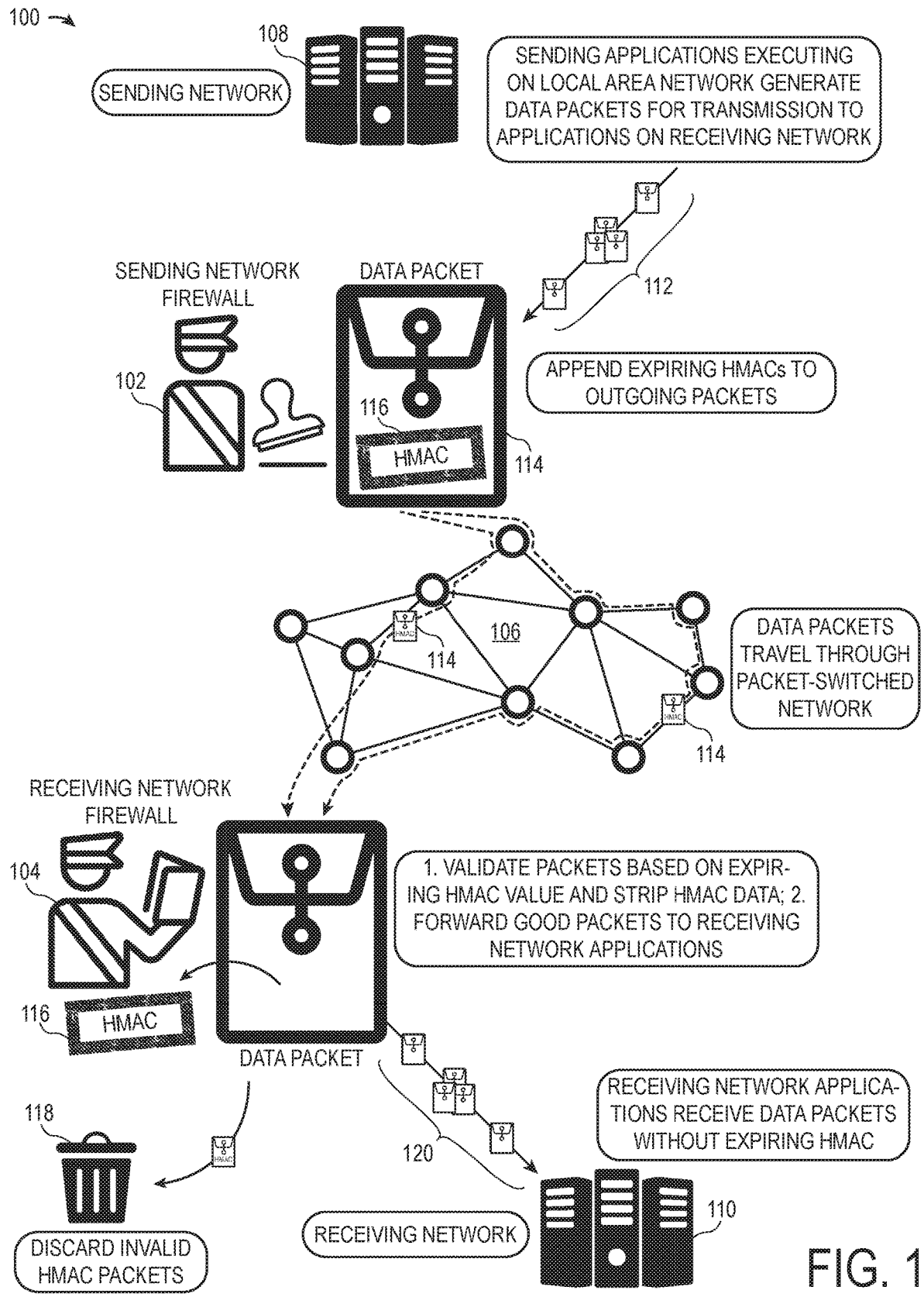
FIG. 1 is a network diagram of two network firewalls on a packet-switched network securely communicating expiring HMAC packets between applications on two local area networks in accordance with some implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In packet-switched data communications networks, data transmissions between a sender and a receiver are packetized into discrete data packets and routed across the network according to routing rules for the data packets to travel to reach a receiver. Routing rules may be based on information in a header of the data packet containing metadata on the packet that is separate from a data payload. A communications channel on the packet switched network is only occupied during transmission of a packet. Upon completion of a packet transmission, the channel is made available for the transfer of other traffic. A receiver of a data transmission may reassemble data packets into an original communication and request resending of any missed or dropped data packets. Packet-switched networks thus provide a fault-tolerant, efficient path for transmitting data across a network between senders and receivers.

Communications across packet-switched communications networks, especially public networks such as the internet, are susceptible to various attacks due to the way data packets are routed across the network through untrusted network hops. One type of attack is a "man-in-the-middle" attack where the network topology includes an attacker located between a sender and receiver of data such that the attacker can intercept data packets, alter the packets, and retransmit the altered packets over the network. A receiver of data packets may not realize the data packets have been altered and could believe received data packets originated with the sender and not the attacker. There are often various opportunities for an attacker to intercept data packets, such as over an unencrypted wireless access point, by gaining access to an Internet Service Provider (ISP) or network infrastructure near the sender, etc.

Defenses against man-in-the-middle attacks (e.g., authentication and encryption schemes, latency detection, forensic analysis, etc.) can be unreliable due to requirements such as the need to trust an authority (e.g., certificate pinning) to maintain adequate cryptographic key hygiene, and/or to correctly account for normal network transmission times.

A novel approach to defending against attacks is to augment data packets with security information that includes an expiring Hash-Based Message Authentication Code (HMAC). An HMAC is a type of message authentication code based on a cryptographic hash function and a secret shared cryptographic key or shared secret. Various cryptographic hash functions may be used to generate an HMAC. The resulting strength of the HMAC depends upon the strength of the underlying hash function, the size of the hash output, and the size and quality of the secret key.

One type of HMAC is an expiring one-time use password based on the secret key and the current time (e.g., a current clock time, an event counter, etc.). Expiring HMACs may be generated according to an algorithm that synchronizes HMAC generation between a sender and receiver of the codes. For example, a Time-Based One Time Password (TOTP) algorithm may be used to calculate expiring HMACs (also known as an HMAC-based One-time Password (HOTP) algorithm). Throughout this disclosure, the term "expiring HMAC" refers to any expiring hash-based code or password.

In some implementations, the clock time is represented as a stepwise function such that a single expiring HMAC is associated with a period of time (e.g., a new HMAC every 30 seconds). An HMAC may be deemed valid for only a certain time period (e.g., only during the 30 second period in which the HMAC is current, a trailing window of three prior HMACs, etc.). Attacking a communication secured by the expiring HMAC can be problematic because the HMAC can only be copied for a short time window during which the HMAC remains valid. A man-in-the-middle attacker, for example, would need to either complete an attack before a valid HMAC expires or steal the secret cryptographic key to generate her own valid HMACs. In implementations, the entire HMAC layer of the stack is encrypted (e.g., asymmetric or symmetric encryption) based on encryption keys known to the sending and receiving parties. Even if an attacker can generate one or more valid HMACs, the attack would fail unless the attacker also stole the layer's encryption key(s).

As the validity time window shrinks, an attacker would need to be faster to make a successful expiring HMAC copying attack. A shorter validity time window is more secure but also makes it more likely that a bona fide sender's packet will arrive outside the window and will need to be re-sent with a fresh HMAC. Out of sync clocks can cause problems with a shorter validity window because a receiving network may reject all incoming packets having a stale HMAC. On the other hand, if the sending network and the receiving networks are synchronizing with the same clock, then a shorter validity window would cause fewer falsely rejected packets and increased security compared to existing packet filtering systems. Simple HMAC copying attacks therefore become less likely to succeed as the validity time window gets shorter, assuming the secret seed has not been compromised.

FIG. 1 is an exemplary network diagram 100 of two network firewalls, a sending network firewall 102 and a receiving network firewall 104, on a packet-switched network 106. The network firewalls 102 and 104 securely communicate expiring HMAC packets between applications on two local area networks 108 and 110 in accordance with some implementations. The sending network 108 can include one or more data generating devices such as a single device or a local area network composed of many devices.

Applications running on the sending network 108 generate network traffic data packets 112 to pass through the sending network firewall 102. The sending network firewall may be a device receiving network traffic 112 from a local area network or it may be executing on the one or more devices of the sending network 108. When the sending network firewall 102 receives network traffic data packets 112, the sending network firewall 102 creates an expiring HMAC data packet 114 by augmenting at least one of the data packets received from the sending network 108 with the expiring HMAC 116. The sending network firewall 102 thus creates a stream of data packets, of which expiring HMAC data packet 114 is one, out of the stream of outgoing data packets 112.

The sending network firewall 102 may additionally augment the secure data packet 114 with additional data such as a single use nonce value, a universally unique identifier (UUID) associated with the sending network 108 or a device on the sending network 108, and other optional security information as disclosed herein.

The expiring HMAC 116 itself is calculated by the sending network firewall 102 based on a secret seed value shared with the receiving network firewall 104 and a current clock time. The expiring HMAC 116 may be appended or attached to the secure data packet 114 in several ways. One way is to use the options field in the data packet header. Depending on the routing rules of the packet switched network 106, data in the options field of the data packet header may be stripped as the secure data packet 114 travels across the various network hops of the network 106. Another way to augment the secure data packet 114 with the expiring HMAC 116 is to append or prepend the expiring HMAC 116 to the data payload.

In at least one implementation, the expiring HMAC 116 is an additional layer in a network communications stack. For example, the expiring HMAC 116 may become a layer in the stack between the final transport layer and the payload (e.g., between the TCP layer and the Data layer if the packet-switched network 106 operates according to a TCP/IP-based communications model. An HMAC-secured data packet 116 may therefore differ from other data packets by adding an HMAC Layer (e.g., IP Layer/TCP Layer, HMAC Layer, and Payload Layer) compared to a data packet without an HMAC (e.g., IP Layer, TCP Layer, Payload).

Organizing HMAC secured packets with the HMAC itself as a separate layer provides benefits over other more typical data packets organizations. One benefit of an HMAC layer in the communications stack is more efficient recognition and parsing of the information in the data packet. Another benefit is for outside communications protocols to be able to more readily recognize whether a data packet is an HMAC packet or not. In one implementation, the HMAC layer is included in the definition of an HMAC packet as a published or known identifier (e.g., a "magic number") that can be parsed by network participants and network infrastructure on the assumption that the presence of the known identifier identifies an HMAC data packet.

After appending of the expiring HMAC 116, a secure data packet 114 travels over the packet switched network 106 according to the routing rules of the network. After traversing network hops, the secure data packet 114 arrives at the receiving network firewall 104. The receiving network firewall 104 validates the expiring HMAC 116 by calculating valid HMAC values based on the secret seed shared with the sending network firewall 102, in some implementations in combination with a current clock time or event counter. The receiving network firewall 104 may apply validity rules to the secure data packet 114. Validity rules include whether an expiring HMAC associated with a prior time period may be deemed valid to compensate for out of sync time clocks between the sending network firewall 102 and the receiving network firewall 104, longer latency times across the packet switched network 106, etc.

If the secure data packet 114 does not satisfy the validity condition rules applied by the receiving network firewall 104 with respect to the expiring HMAC 116 and/or other security information included in the secure packet 114 (e.g., nonce, UUID, etc.), then the receiving network firewall 104 will direct the secure packet 114 to a discard location 118 (e.g., to/dev/null). If the secure data packet 114 does satisfy the validity condition rules applied by the receiving network firewall 104 with respect to the expiring HMAC 116 and/or other security information, then the receiving network firewall 104 may strip the HMAC 116 and/or other security information from the secure data packet 114 before forwarding the secure data packet 114 together with other network traffic 120 to the receiving network 110 (e.g., to a particular application executing on a device of the receiving network 110).

An important aspect of the system 100 is that the applications executing on the sending network 108 and the applications executing on the receiving network 110 need not be aware of the existence of the expiring HMACs on secure packets or with rules regarding the validity of such packets. Appending expiring HMAC to data packets is performed at the network boundary of the sending network 108. On the other end of the channel, validation and removal of the HMAC from the secure packets is handled at the boundary of the receiving network 110 by the receiving network firewall 104. All of the rules regarding sharing of the secret key, valid time windows, whether a nonce has been seen before or not, etc. can be handled by the respective firewalls only. The system 100 therefore improves on existing packet switched networks because existing applications and infrastructure can be upgraded to a higher security level without any modifications needed to existing applications that communicate over the network 106.

The system described herein thus improves security in public packet switched networks by hardening network firewalls against attacks that involve spoofing client IP addresses or by other conventional firewall attacks.

Figure 2:
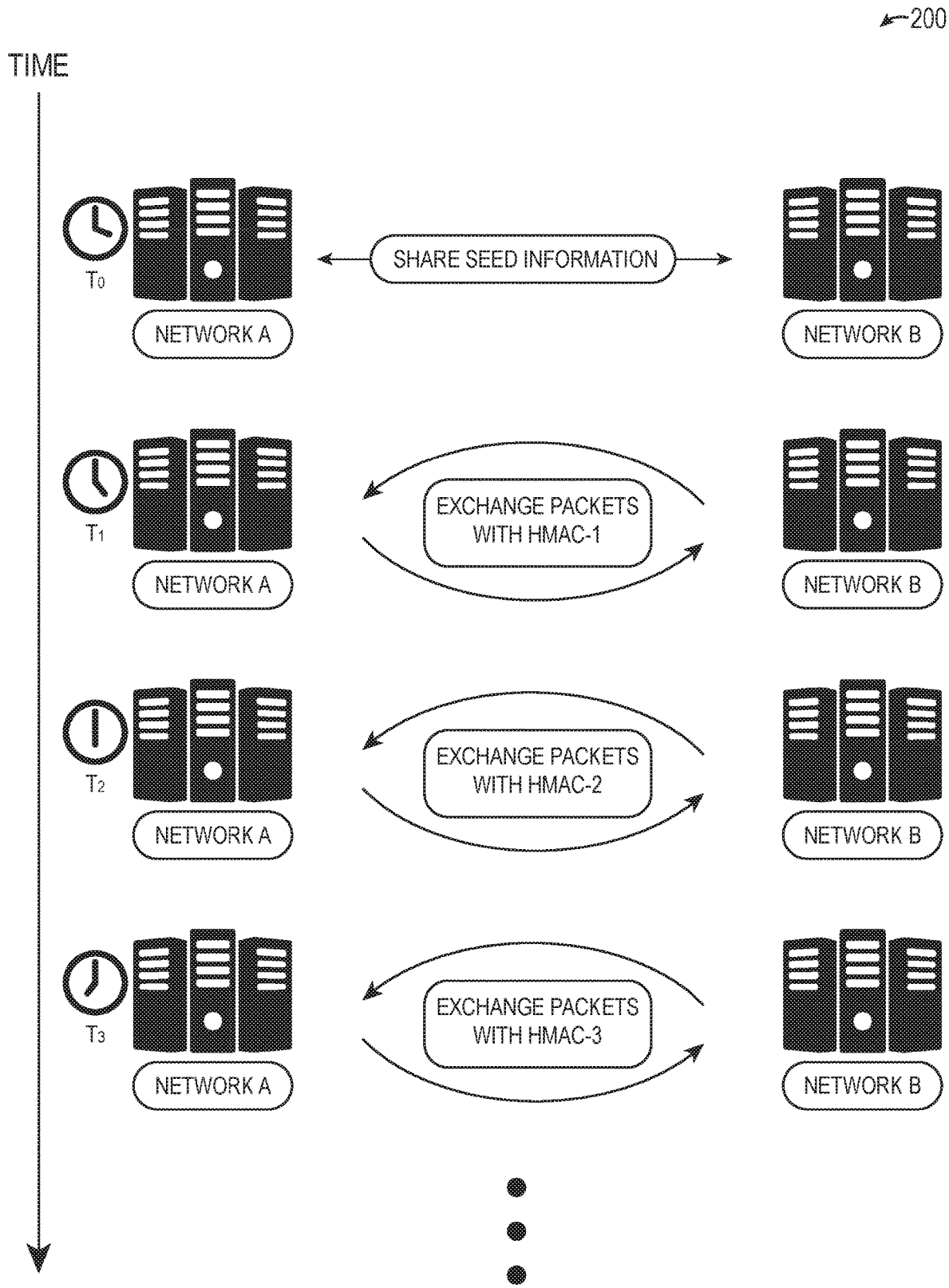
FIG. 2 is a time-series diagram of two local area networks communicating with each other over a packet-switched network with expiring HMAC packets in accordance with some implementations.

FIG. 2 is a time-series diagram 200 of two local area networks communicating with each other over a packet-switched network with an expiring HMAC packet communications protocol in accordance with some implementations. Time is shown vertically in FIG. 2 with an earlier time $T_0$ above later times $T_1$-$T_3$.

At time $T_0$, the two local area networks, Network A and Network B, share a secret seed value and potentially additional security information regarding the rules for calculating valid HMACs for use in secure data packet communications. Examples of additional security information regarding rules for calculating valid HMACs include without limitation, an issuer, an account name that is optionally used to salt the HMAC, a shared secret key of an agreed length, a flag indicating whether the HMAC is time based or counter based, a cryptographic hashing algorithm (e.g., SHA-1, SHA-256, etc.), a valid time period, a length and/or format of the HMAC, clock synchronization parameters, timeout and validity parameters, whether there are private key management requirements such as hardware signing, etc.

Network A and Network B may share the secret seed value and additional security information at time $T_0$ in several ways. For example, the two networks can use public key cryptography to encrypt a secret seed such that the recipient and owner of a published public key is the only one who can decrypt. Seed information can be shared based on private key cryptography also if Network A and Network B have already shared a private key. Other channels could also be used to share the seed such as an unencrypted communications channel or an out of band channel such as voice or paper communications.

In one implementation, starting at time $T_1$, Network A and Network B exchange secure data packets with expiring HMAC-1. HMAC-1 is simultaneously and independently calculated by Network A and Network B during time $T_1$ based on the shared secret seed and the clock time at time $T_1$. Network A and Network B may be both senders and recipients of secure data packets, during time $T_1$, such as if a network firewall is augmenting outgoing data packets with HMAC-1 and stripping HMAC-1 from incoming packets received from the other network, respectively.

At time $T_2$ in this implementation, the HMAC-1 password is stale and a new HMAC-2 is simultaneously and independently calculated by Network A and Network B. Secure communications continue between the two networks during time $T_2$ using HMAC-2. During time period $T_3$ and subsequent time periods, the process of Network A and Network B independently and simultaneously calculating the same HMAC based on the shared secret and the time clock and using the same HMAC for secure data packets continues. Once the secret has been successfully shared between Network A and Network B, the process of calculating HMACs for secure data packets can continue indefinitely and will remain secure so long as the shared secret is not compromised.

Figure 3:
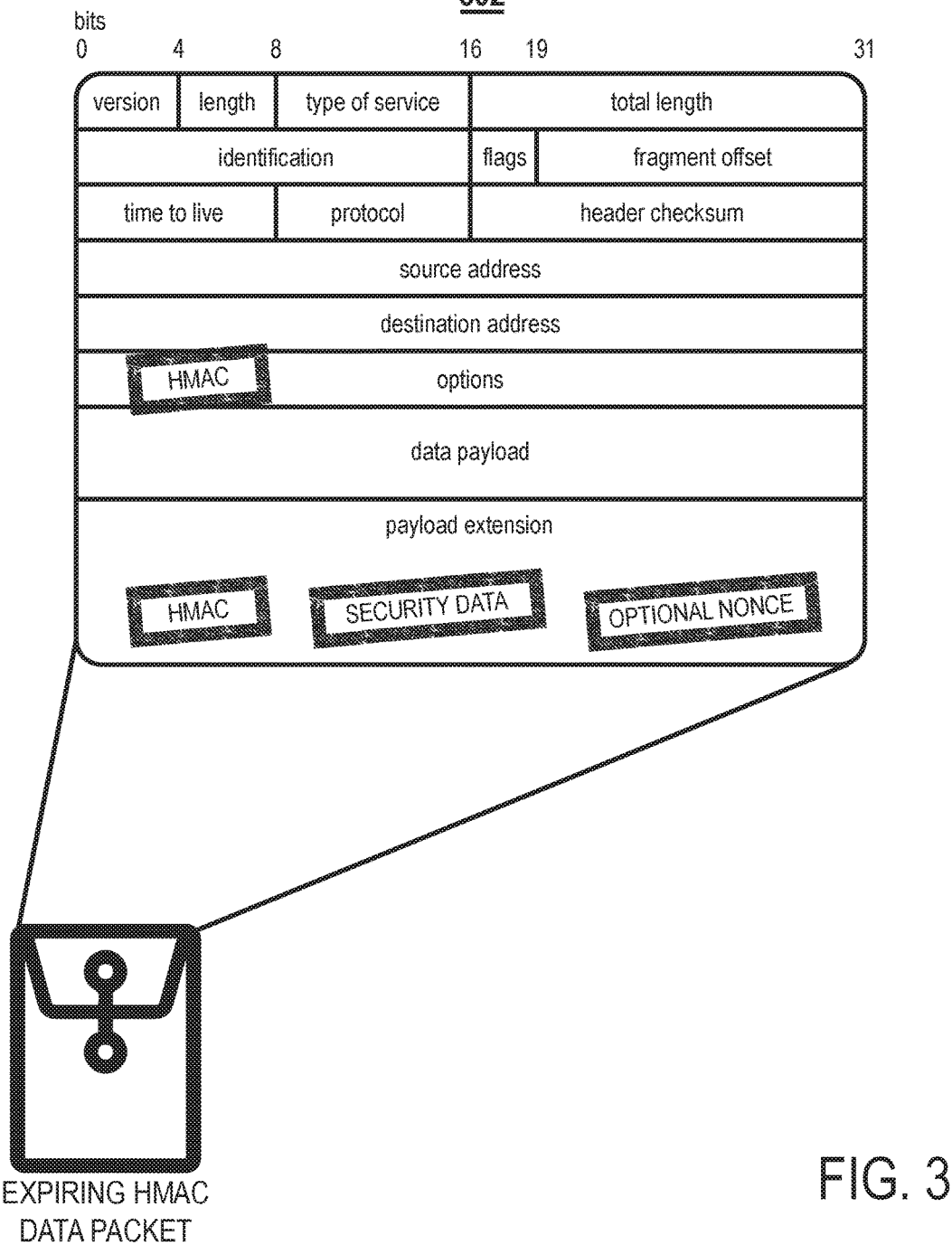
FIG. 3 is a block diagram of the contents of an example secure expiring HMAC data packet in accordance with some implementations.

FIG. 3 is a block diagram 300 of the contents of an example secure expiring HMAC data packet 302 in accordance with some implementations. In the implementation illustrated by FIG. 3, the secure expiring data packet 302 is 32 bits wide with space reserved for certain fields in a header of the data packet ("version" through "options" in the example of FIG. 3). The options header field is one place where the expiring HMAC can be included in a secure HMAC data packet. In some implementations, nodes on packet switched networks may strip certain information from a data packet header including information stored in the options header field. If the nodes on the packet switched network strip the options header, then the secure data packet will likely arrive at the receiving network, but the receiving network will not be able to determine whether the packet is valid. The HMAC and other security data may be viewed as a "thin payload" attached to the secure expiring HMAC data packet 302.

The expiring HMAC may alternatively or additionally be stored in the data packet's payload. In other implementations, the expiring HMAC may be appended or prepended to the data payload, such as in the payload extension illustrated in FIG. 3. Other security information may be stored in the options header field or in the payload to be used in conjunction with the expiring HMAC. In one implementation, every secure data packet is assigned a one-time value referred to herein as the nonce value. A sending network may choose the nonce from a nonce address space of a desired size. A receiving network may track which nonces it has seen on packets originating from a sending system with valid HMACs. If an attacker is trying to replay any of the secure packets, the receiving network may see that certain nonces are being seen twice. Having not seen a nonce more than once may be one of the conditions of satisfying the validity condition at a receiving network to reduce risk of accepting a data packet that an attacker has successfully tampered.

In another implementation, the expiring HMAC is a new network layer inside the data packets, in addition to, or occupying part of, a payload layer. When the public packet switched network is the internet, the expiring HMAC layer may be inserted between the TCP layer and the payload in the stack. Separating the expiring HMAC into a dedicated communications protocol layer simplifies recognition and parsing of packets by network communications infrastructure, thus improving communications efficiency by appropriately routing the secure data packets, by providing a descriptor associated with the expiring HMAC data packets (e.g., a "tag"). For purposes of this disclosure, a "dedicated" network protocol layers includes a network protocol layer other than the network, transport, and/or payload layer dedicated to transmitting the HMAC.

In another implementation, the additional security data includes a universal unique identifier (UUID) identifying the origin of the data packets. The UUID may be used in a variety of ways including as a lookup to access a shared secret associated with the UUID. For example, if a protected endpoint is servicing a fleet of devices (e.g., Internet-of-Things devices), each device in the fleet may use a different shared secret with the protected endpoint. When the protected endpoint receives a secure data packet, validating the secure data packet may depend on the device from which it originated, and the protected endpoint can access the appropriate shared secret for validation for the device based on the UUID in the secure data packets received therefrom. The additional security data may further include a protocol identifier.

Since the payload extension can be a layer appended to the rest of the secure data packet 302, the payload extension can include a cryptographic hash digest of the rest of the packet, including the data payload, the packet header, or both. Since any changes to the content of what is hashed will result in a different hash digest, including a hash in the payload extension allows a recipient to test whether the payload extension "belongs" to the data packet. In other words, if an attacker stole a valid payload extension and coupled it with a malicious data packet, a recipient would be able to check that the payload extension does not "match" the malicious data packet and may discard it as having evidence of tampering. A hash in the payload extension is thus a protection against replay attacks.

In another implementation, the entire secure expiring HMAC data packet 302 is encrypted except for a UUID in a payload extension. Encrypting the entire packet 302 will block an attacker who does not have a cryptographic key capable of decrypting the data packet 302 from reading the contents of the packet. To allow encrypted packets to be read by intended recipients, the UUID can be left in cleartext. A recipient thus would know from which device the packet originated by reading the cleartext UUID and can lookup an appropriate key to decrypt the data packet 302 if the recipient knows what key the device originally used to encrypt the packet 302. In this implementation, new devices on a network must register with recipients such that the recipients will recognize the UUID as valid and will know which key to use to decrypt packets from the new device. Encrypting the whole data packet 302 except for the UUID leaks as little information as possible to potential attackers and this reduces the risk of a successful replay attack.

In other implementations, additional security information may be included in the payload extension such as fingerprinting information relating to a sending device. Examples include IDs from a chip and/or processor on-board the sending device, a hash digest of a physical characteristic of the device (e.g., physical network address, MAC address, hardware revision, etc.). This information may be looked up by a sending device to verify that the payload extension originated with a sending device and not an attacker.

Figure 4:
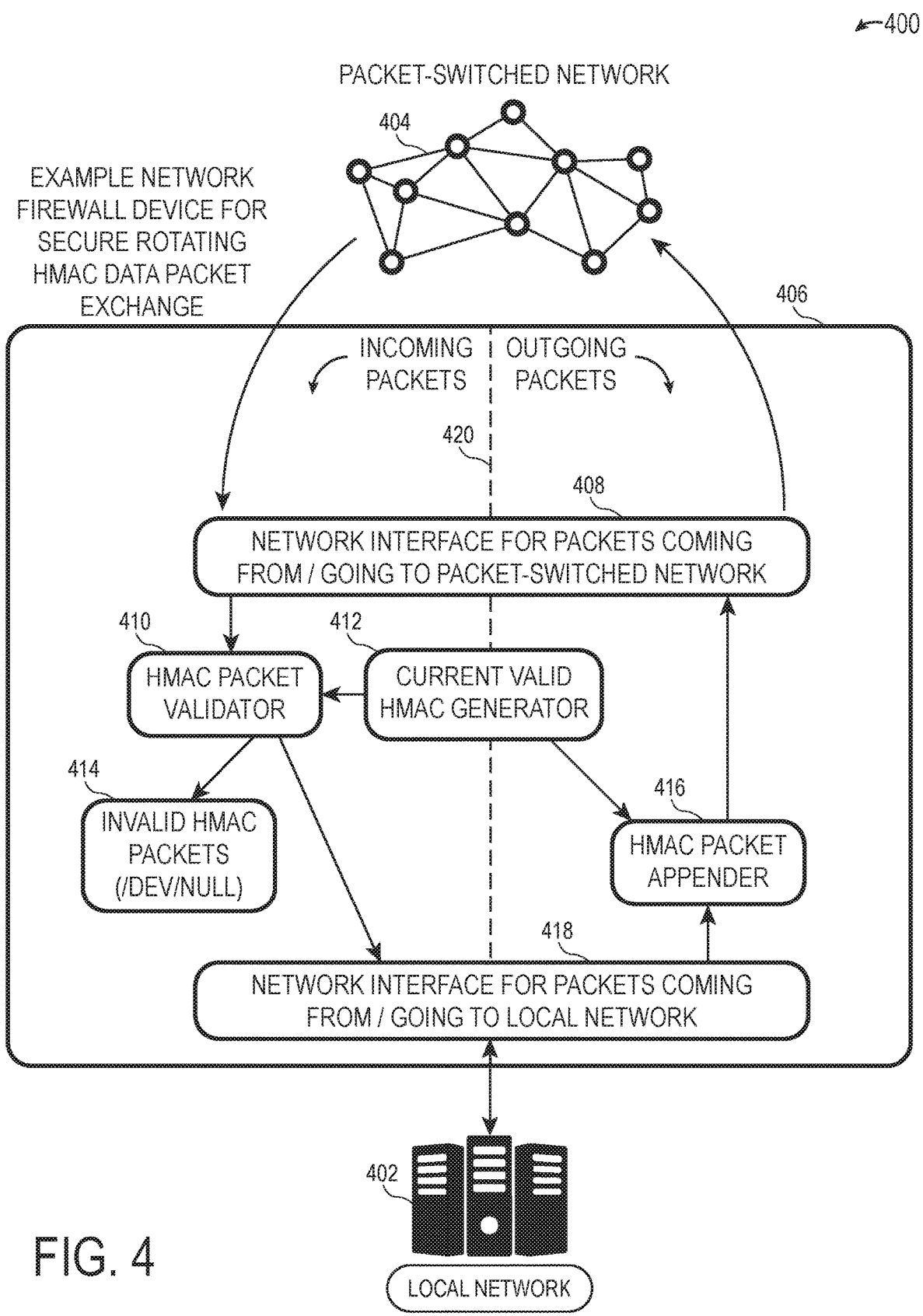
FIG. 4 is a block diagram of an example network firewall device for secure expiring HMAC data packet exchange in accordance with some implementations.

FIG. 4 is a block diagram 400 of an example network firewall 406 for secure expiring HMAC data packet exchange in accordance with some implementations. The network firewall 406 is in communication with the public packet switched network 404 and communicates with data recipients over the network 404 on behalf of a local network 402. The local network 402 may be a single machine or a group of machines connected into a private network. The network firewall 406 has components that handle incoming data packets, outgoing data packets, or both. As illustrated in FIG. 4, components of the network firewall 406 that handle incoming packets are arranged to the left of the vertical dashed line 420, components that handle outgoing packets are arranged to the right of the vertical dashed line 420, and component that handle both are intersected by the vertical dashed line 420.

Expiring HMAC data packets that are incoming to the network firewall 402 are transmitted from the packet switched network 404 to a network interface 408. The network interface 408 receives the expiring HMAC data packets from the network 404 and reads header and body information from the packets for transmission to other components of the network firewall 406.

Another component of the network firewall dedicated to incoming expiring HMAC packets is the HMAC packet validator 410. The HMAC packet validator 410 determines whether a data packet satisfies the validity condition and routes passing packets to the network interface 418 for delivery to their destinations on the local network 402. If the HMAC packet validator 410 determines that a data packet does not satisfy the validity condition (e.g., the HMAC is stale, the HMAC is invalid, a nonce on the packet has already been seen, a UUID is invalid, and/or other security data indicates a fail such as originating IP address, etc.), the HMAC packet validator 410 discards the failing packet to the trash 414.

An input to the HMAC packet validator 410 is one or more HMACs from the current valid HMAC generator 412. The current HMAC generator 412 generates HMACs based on the secret shared with the sender/recipient of the data packets and a current clock time. The current valid HMAC generator 412 may take inputs from the HMAC packet validator 410 such as a UUID to lookup the correct shared secret. In one implementation, the HMAC packets expire on a fixed schedule (e.g., every 30 seconds) and the current valid HMAC generator 412 calculates and transmits a new HMAC every 30 seconds to the HMAC packet validator 410. The HMAC packet validator 410 can then decide which of the received HMACs should be accepted as meeting the validation condition (e.g., a packet sent near the time boundary with the next HMAC may not arrive until after the next HMAC is active; the HMAC packet validator 410 may therefore accept HMACs from prior time periods to the present time period).

On the right side of the vertical dashed line 420 are components handling outgoing packets from the local network 402 to be transmitted across the packet switched network 404. The network interface 418 transmits packets from the local network 402 to the HMAC packet appender 416. The HMAC packet appender may take input from the current valid HMAC generator 412 of an HMAC calculated based on the shared secret and other security information to include in the outgoing packets. In one implementation, the shared secret depends on the identity of the recipient. Once the HMAC packet appender has received the HMAC from the current valid HMAC generator, it augments the outgoing packets and passes them to the network interface 408 for transmission across the network 404.

Figure 5:
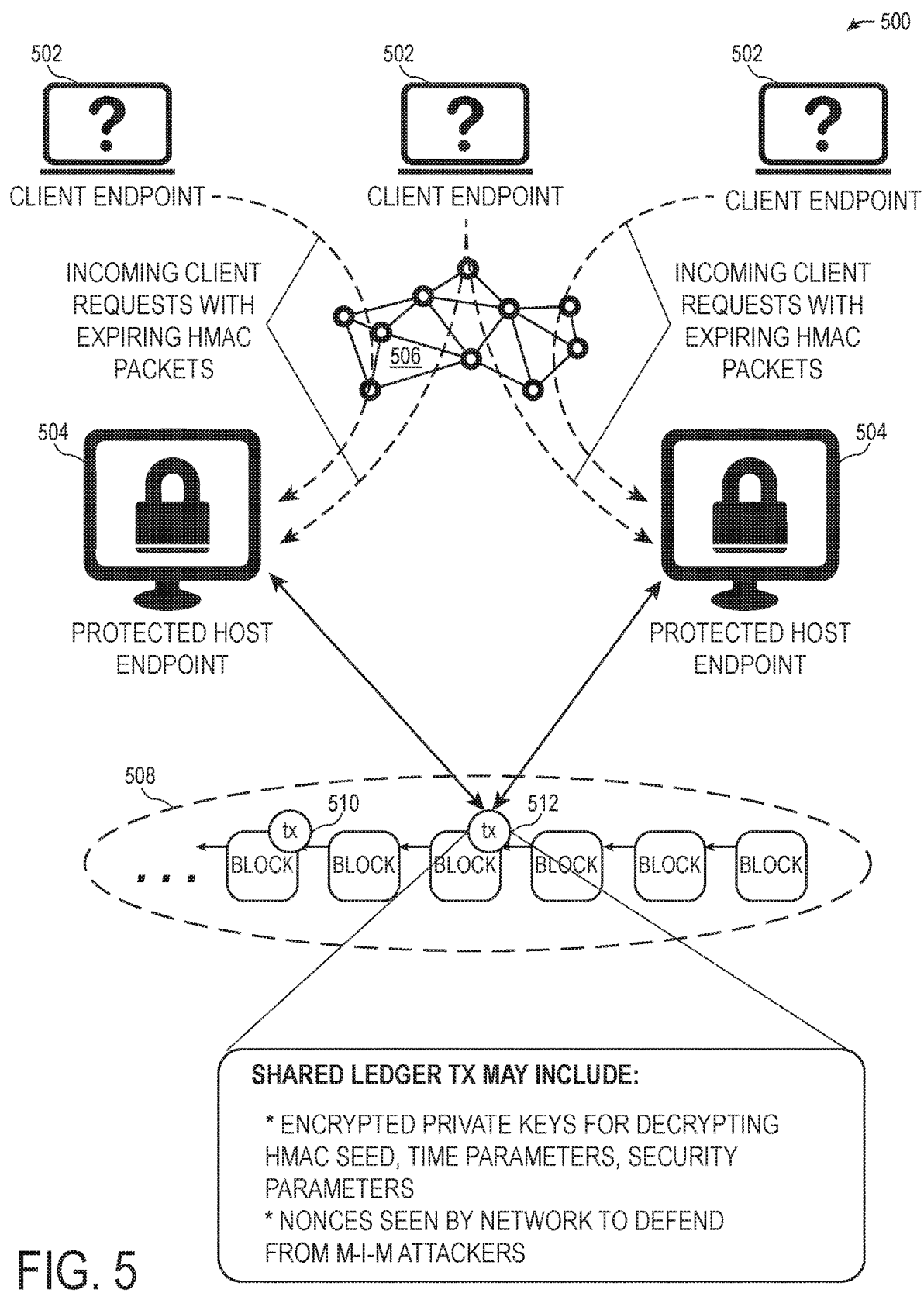
FIG. 5 is a block diagram of example protected host endpoints serving a group of client endpoints over a packet-switched network using expiring HMAC data packets further secured by a blockchain in accordance with some implementations.

FIG. 5 is a block diagram 500 of example protected host endpoints 504 serving a group of client endpoints 502 over a packet-switched network 506 using expiring HMAC data packets further secured by a blockchain 508 in accordance with some implementations. In one implementation, the client endpoints 502 are IoT devices receiving instructions and/or providing data to the protected host endpoints. In this configuration the client endpoints may have UUIDs included on their secure packets sent over the network 506. In the configuration illustrated in FIG. 5, the client endpoints 502 and the protected host endpoints 504 may be synchronized with the same clock to minimize out of sync HMAC generation (e.g., the network components disagree over whether an HMAC is valid or stale).

The protected host endpoints 504 may include a policy engine to determine rules for acceptance of incoming expiring HMAC data packets. The policy engine's rules may include rules in addition to a valid expiring HMAC such as origination from a specific host, such as one of the client endpoints 502. In implementations, the policy engine includes packet-level rules determining whether packets are accepted at the protected host endpoints 504.

According to one workflow, client endpoints 502 are registered to communicate with protected host endpoints 504 by storing a key on the blockchain 508, such as a key that encrypts client packets. When a protected host endpoint 504 receives data packets from a client endpoint 502, the protected host endpoint 504 may verify an HMAC in the packet against the key stored on the blockchain 508. Accordingly, storing decryption keys on a blockchain 508 may only be possible if the blockchain 508 is a permissioned ledger not available to an attacker. If the client endpoint 502 is not registered with the system 500, then there will be no corresponding key to validate the HMAC of the received packet and/or decrypt the received packet. In this way, authorized client endpoints 502 can be managed according to a shared ledger that is hardened against attacks that would require rewriting the blockchain 508 to modify a key (e.g., re-doing all the proof-of-work of the blockchain 508 needed to rewrite the ledger).

In another implementation, the blockchain 508 may include firewall rules to be applied by the protected host endpoints 504. The firewall rules may be accessed by the protected host endpoints 504 by searching a copy of the blockchain 508 and verifying the blockchain satisfies the consensus rules (e.g., no transactions have been recorded in the searched copy of the blockchain that do not satisfy consensus rules of the network). In this way, attackers will not be able to modify the firewall routing rules applied by the protected host endpoints 504 without successfully attacking the blockchain 508.

In one implementation, the client endpoints 502 are IoT devices and include a secure enclave for storing the shared secret used to generate and validate HMACs for use in connection with the system 500. The secure enclaves may be seeded at device manufacture time or may be securely pushed from the protected host endpoints 504. A secure enclave increases defense against an attacker who gains physical access to one of the client endpoints 502 or who tries to access the shared secret by unauthorized access to a part of the client endpoint 502 outside the secure enclave.

As illustrated in FIG. 5, a shared ledger or blockchain 508 includes information queried by the protected host endpoints 504. The blockchain 508 is a chain of digital signatures secured by blockchain network participants. If a majority of honest nodes maintain the blockchain 508, then information may be stored on the ledger in a way that cannot be changed without redoing the chain of digital signatures, likely at a high cost, depending on the security level of the blockchain 508. If information in the blockchain 508 cannot be changed by an attacker (e.g., the ledger is immutable), then parameters of the system described herein may be safely stored on the blockchain 508. For example, parameters of the HMAC generation such as validity time and known nonces may be stored on the blockchain 508 such that an attacker who wishes to make an attack based on changing the validity time or re-using a nonce will not be successful. The blockchain 508 can also serve as a repository for encrypted keys for carrying out aspects of the system described herein. The blockchain 508 may store a list of valid UUIDs of client endpoints 502 such that a protected host endpoint 504 will not accept packets from a client endpoint unless the client endpoint has been "registered" on the blockchain 508. Security in this scenario may depend on the blockchain 508 being a permissioned ledger to which an attacker cannot write new UUIDs.

Components of the system 500, such as the protected host endpoints 504 and/or the client endpoints 502 may include an unextractable trusted platform module (TPM) for securing critical pieces of information (e.g., private keys, shared secret, etc.). In some implementations, operations described herein include performing some or all of the operation on the TPM. For example, a component of the system may encrypt a packet and/or payload, sign a blockchain transaction, etc. on the TPM and without exposing the critical information to compromised portions of the system outside the TPM.

Figure 6:
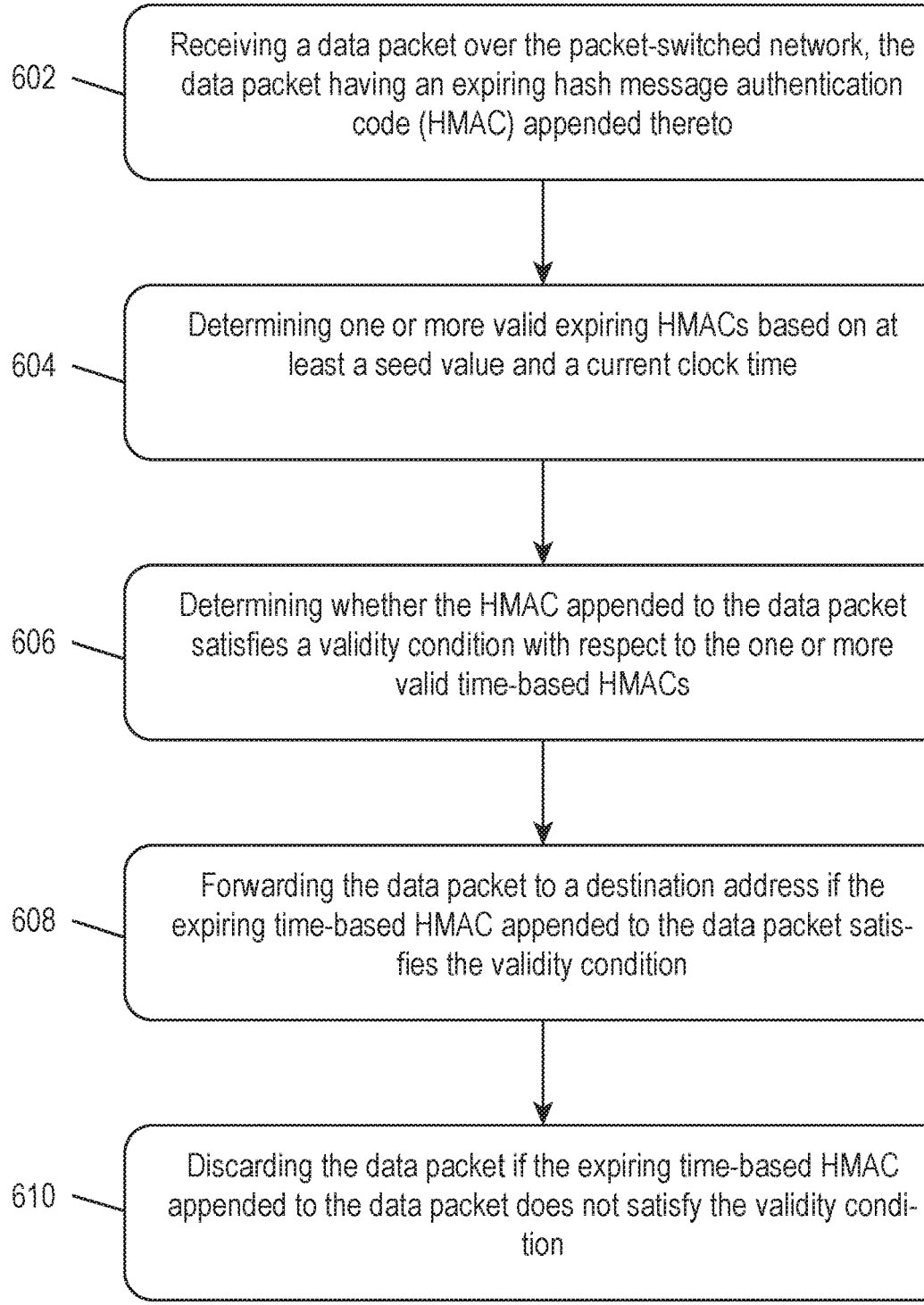
FIG. 6 is a flowchart of a method of secure data packet transmission in accordance with some implementations.

FIG. 6 is a flowchart of a method 600 of secure data packet transmission in accordance with some implementations. A receiving step 602 receives a data packet over a packet switched network having an expiring time-based HMAC appended thereto. The HMAC may be inserted into a header of the data packet or prepended or appended to a data payload of the packet. A determining operation 604 determines one or more valid expiring HMACs based on at least a seed value and a current time clock. The seed value may be a secret shared with a sending system of the data packet. Depending on a time of the HMAC, the determining step 604 may determine more than one HMAC including HMACs based on elapsed time periods.

A determining operation 606 determines whether the HMAC appended to the data packet satisfies a validity condition with respect to the one or more valid expiring HMACs determined in the determining operation 604. In one implementation, more than one HMAC is deemed to satisfy the validity condition such as HMACs associated with elapsed time periods. If HMACs associated with elapsed time periods are not deemed to satisfy the validity conditions, then data packets send near the boundary between time periods may arrive during the next time period, thus increasing the fail rate. On the other hand, accepting HMACs associated with prior time periods may increase the risk of the man-in-the-middle attack if the attacker can replay an old HMAC.

A forwarding operation 608 forwards the data packet to a destination address if the expiring HMAC appended to the data packet satisfies the validity condition. The forwarding operation 608 may forward the data packet to an application running on the same device as performs the operations 600 or to another device, such as a device that is part of a local area network served by a firewall performing the operations 600. A discarding operation 610 discards the data packet if the expiring HMAC appended to the data packet does not satisfy the validity conditions. Examples of an HMAC not satisfying a validity condition include stale HMACs or other data associated with the HMAC failing such as a reused nonce or invalid UUID.

Figure 7:
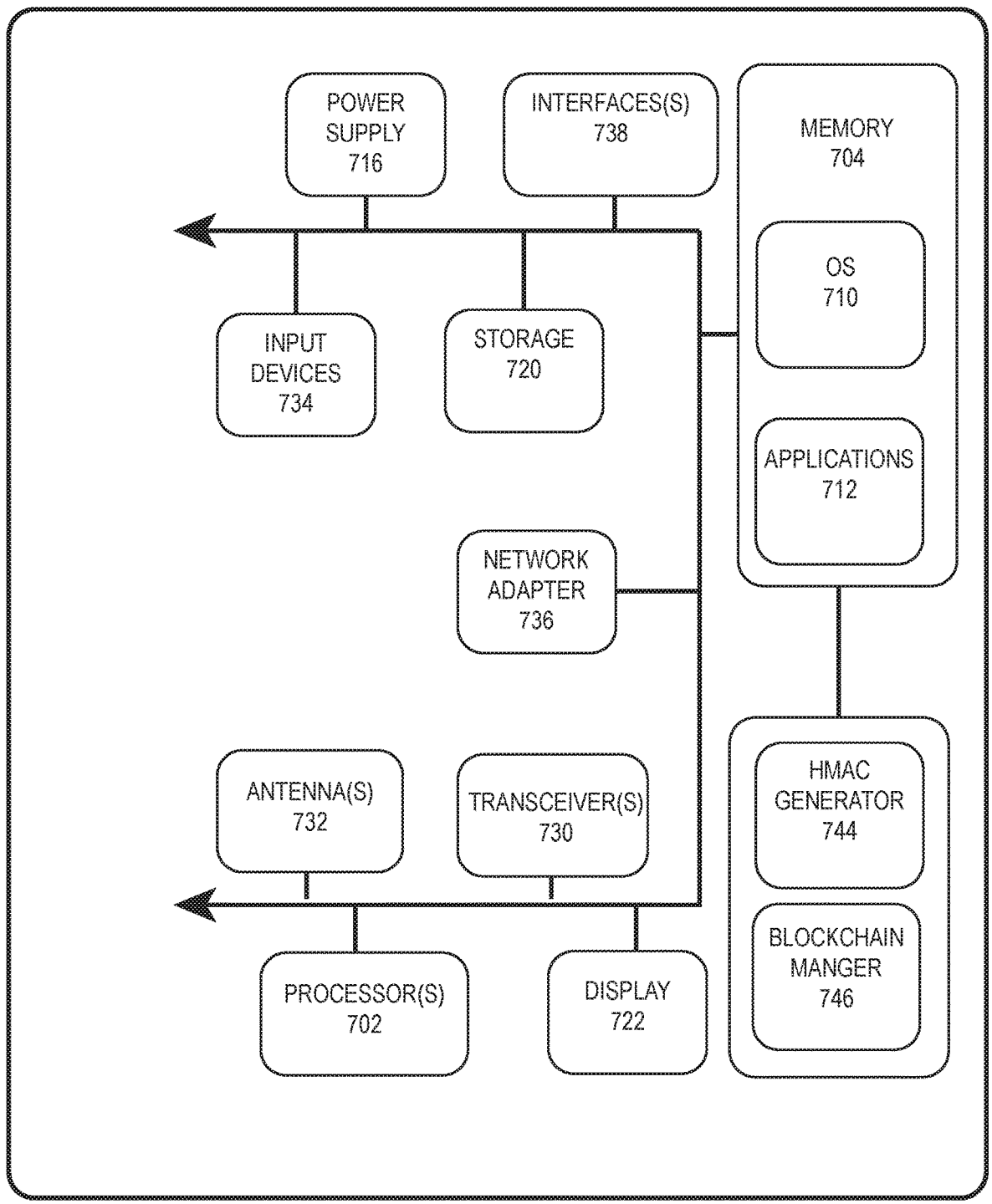
FIG. 7 is a diagram of a device that may be useful for implementing expiring HMAC security packets.

FIG. 7 is a diagram of a device that may be useful for implementing expiring HMAC security packets. FIG. 7 illustrates an example system (labeled as a processing system 700) that may be useful in implementing the described technology. The processing system 700 may be a client device, such as a smart device, connected device, Internet of Things (IoT) device, laptop, mobile device, desktop, tablet, or a server/cloud device. The processing system 700 includes one or more processor(s) 702, and a memory 704. The memory 704 generally includes both volatile memory (e.g., RAM) and non-volatile memory (e.g., flash memory). An operating system 710 resides in the memory 704 and is executed by the processor 702.

One or more application programs 712 modules or segments, such as HMAC generator 744 and blockchain manager 746 are loaded in the memory 704 and/or storage 720 and executed by the processor 702. In some implementations, the HMAC generator 744 is stored in read-only memory (ROM) 714 or write once, read many (WORM) memory. Data such as extrinsic event data sources may be stored in the memory 704 or storage 720 and may be retrievable by the processor 702 for use by HMAC generator 744 and the blockchain manager 746, etc. The storage 720 may be local to the processing system 700 or may be remote and communicatively connected to the processing system 700 and may include another server. The storage 720 may store resources that are requestable by client devices (not shown). The storage 720 may include secure storage such as one or more platform configuration registers (PCR) managed by one or more trusted platform modules (TPMs), which may be implemented in a chip or by the trusted execution environment (TEE).

The processing system 700 includes a power supply 716, which is powered by one or more batteries or other power sources and which provides power to other components of the processing system 700. The power supply 716 may also be connected to an external power source that overrides or recharges the built-in batteries or other power sources.

The processing system 700 may include one or more communication transceivers 730 which may be connected to one or more antenna(s) 732 to provide network connectivity (e.g., mobile phone network, Wi-Fi®, Bluetooth®, etc.) to one or more other servers and/or client devices (e.g., mobile devices, desktop computers, or laptop computers). The processing system 700 may further include a network adapter 736, which is a type of communication device. The processing system 700 may use the network adapter 736 and any other types of communication devices for establishing connections over a wide-area network (WAN) or local area network (LAN). It should be appreciated that the network connections shown are exemplary and that other communications devices and means for establishing a communications link between the processing system 700 and other devices may be used.

The processing system 700 may include one or more input devices 734 such that a user may enter commands and information (e.g., a keyboard or mouse). Input devices 734 may further include other types of input such as multimodal input, speech input, graffiti input, motion detection, facial recognition, physical fingerprinting, etc. These and other input devices may be coupled to the server by one or more interfaces 738 such as a serial port interface, parallel port, universal serial bus (USB), etc. The processing system 700 may further include a display 722 such as a touch screen display.

The processing system 700 may include a variety of tangible processor-readable storage media and intangible processor-readable communication signals including in virtual and/or cloud computing environments. Tangible processor-readable storage can be embodied by any available media that can be accessed by the processing system 700 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing system 700. In contrast to tangible processor-readable storage media, intangible processor-readable communication signals may embody computer-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CDROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of secure data packet transmission over a packet-switched communications network, the method comprising:
receiving, at a boundary of a local computer network, a data packet transmitted over the packet-switched network from a sender, the data packet having a hash-based message authentication code (HMAC) appended thereto;
determining a series of valid expiring HMACs based on at least a seed value shared with the sender and a current clock time;
determining whether the HMAC appended to the data packet satisfies a time window validity condition with respect to the series of valid expiring HMACs;
forwarding the data packet to a destination address inside the local computer network if the HMAC appended to the data packet satisfies the time window validity condition;
discarding the data packet if the HMAC appended to the data packet does not satisfy the time window validity condition;
receiving, at the boundary of the local computer network, an outbound data packet originating from inside the local computer network bound for transmission over the packet-switched network;
appending another HMAC from the series of valid expiring HMACs to the outbound data packet; and
transmitting the outbound data packet over the packet-switched network.

2. The method of claim 1, further comprising:
stripping the HMAC appended to the data packet before forwarding the data packet to the destination address.

3. The method of claim 1, wherein the HMAC is appended to a data payload of the data packet.

4. The method of claim 1, wherein the HMAC is inserted into a header of the data packet.

5. The method of claim 1, wherein the time window validity condition is based at least in part on matching a universally unique identifier (UUID) of the sender.

6. The method of claim 1, wherein the data packet includes a nonce value and the time window validity condition includes the nonce value not having been seen on a prior data packet by the operation that determines whether the HMAC appended to the data packet satisfies the time window validity condition.

7. The method of claim 1, wherein the HMAC appended to the data packet is included in a dedicated network protocol layer.

8. An expiring hash-based message authentication code (HMAC) firewall system, the firewall system comprising:
a first network interface that receives data packets from, and sends data packets to, a public packet-switched network;
a current valid expiring HMAC generator that generates a series of valid HMACs, the series of valid HMACs being deterministically calculated based on a seed value and a time factor;
an expiring HMAC packet validator that receives incoming data packets from the public packet-switched network and determines whether an HMAC appended to each data packet satisfies a time window validity condition compared to the series of valid HMACs, the expiring HMAC packet validator sending data packets to a second network interface if the HMAC of the data packet satisfies the time window validity condition and discarding data packets if the HMAC of the data packets does not satisfy the time window validity condition; and
an expiring HMAC data packet appender that appends a valid expiring HMAC to data packets received from the second network interface and forwards the data packets received from the second network interface to the first network interface for transmission on the public packet-switched network.

9. The system of claim 8, wherein the time window validity condition depends at least in part on a universally unique identifier (UUID) of a known sender.

10. The system of claim 8, wherein the expiring HMAC data packet appender further appends a nonce value to the data packets received from the second network interface and the time window validity condition includes comparison to known nonce values.

11. The system of claim 9, wherein the known sender includes a secure hardware enclave for determining valid expiring HMACs.

12. The system of claim 8, wherein the time window validity condition is not satisfied if a data packet arrives at the first network interface more than once.

13. The system of claim 8, wherein the HMAC is encrypted and includes a cryptographic hash digest of a data payload of the data packet.

14. The system of claim 10, wherein the known nonce value is read from a shared ledger.

15. A network of protected host endpoints, the network comprising:
one or more protected host endpoints receiving a stream of data packets from client endpoints over a packet switched network, the data packets in the stream including hash-based message authentication codes (HMACs);
the protected host endpoints including an expiring HMAC validator determining whether data packets in the stream satisfy a time window validity condition, the time window validity condition being based on a series of valid expiring HMACs deterministically created based on a seed value and a changing time value; and
the protected host endpoints further including an expiring HMAC data packet appender that appends a valid expiring HMAC, from the series of valid expiring HMACs, to data packets returned from the one or more protected host endpoints to the client endpoints.

16. The network of claim 15, wherein the seed value is obtained by the one or more protected host endpoints by decrypting an encrypted seed value with a private cryptographic key stored on a shared ledger.

17. The network of claim 15, wherein the time window validity condition depends at least in part on comparing a nonce value in a data packet from a client endpoint to known nonce values stored on a shared ledger.

18. The network of claim 15, wherein the time window validity condition depends at least in part on a known UUID in a data packet from a client endpoint.

19. The network of claim 15, wherein the client endpoints include an unextractable trusted platform module to store a copy of the seed value.

20. The network of claim 15, wherein the one or more protected host endpoints include a policy engine.

* * * * *